United States Patent
Callard et al.

(10) Patent No.: US 10,171,369 B2
(45) Date of Patent: Jan. 1, 2019

(54) SYSTEMS AND METHODS FOR BUFFER MANAGEMENT

(71) Applicants: Aaron James Callard, Ottawa (CA); Philippe Leroux, Ottawa (CA)

(72) Inventors: Aaron James Callard, Ottawa (CA); Philippe Leroux, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 26 days.

(21) Appl. No.: 15/388,657

(22) Filed: Dec. 22, 2016

(65) Prior Publication Data

US 2018/0183724 A1    Jun. 28, 2018

(51) Int. Cl.
*H04L 12/28* (2006.01)
*H04L 12/863* (2013.01)
(Continued)

(52) U.S. Cl.
CPC .......... *H04L 47/6295* (2013.01); *H04L 41/08* (2013.01); *H04L 41/0806* (2013.01); *H04L 43/08* (2013.01); *H04L 49/90* (2013.01)

(58) Field of Classification Search
CPC ..... H04L 12/5602; H04L 41/08; H04L 47/10; H04L 47/11; H04L 47/12; H04L 47/15;
(Continued)

(56) References Cited

U.S. PATENT DOCUMENTS 6,438,134 B1    8/2002  Chow et al.
7,227,842 B1 *  6/2007  Ji ............................ H04L 45/00
                                                                370/235
(Continued)

FOREIGN PATENT DOCUMENTS

CN    105391567 A    3/2016
WO    WO 2014/173466    * 10/2014

OTHER PUBLICATIONS

Wenpeng, Provision and Route Optimization in Differentiated Services Networks, Thesis, Helsinki University of Technology, 106 pages, Sep. 2002.*
International Search Report dated Oct. 31, 2017 for corresponding International Application No. PCT/CN2017/098084 filed Aug. 18, 2017.

*Primary Examiner* — Frank Duong

(57) ABSTRACT

A buffer node and method of buffering packet data units are provided. The buffer node comprises a receive interface configured to receive a complex queue configuration and to receive packet data units, a buffer configured to implement a queue graph configuration associated with the complex queue configuration to buffer incoming packets into queues, and a send interface configured to send the dequeued incoming packets to a destination node. The queue graph configuration comprises at least one classifier configured to determine a classification type for an incoming packet, at least two queues configured to store incoming packets, and at least one dequeuer configured to select a queue from the at least two queues to be dequeued and to apply a dequeueing function on that selected queue. The method comprises a buffer node receiving a complex queue configuration from a configuration entity, receiving a plurality of packet data units from at least one the packet source node, and sending each incoming packet to one of the at least two queues based on the queue graph configuration. The complex queue configuration is associated with a queue graph configuration for buffering packet data units.

22 Claims, 14 Drawing Sheets

(51) Int. Cl.
*H04L 12/24* (2006.01)
*H04L 12/861* (2013.01)
*H04L 12/26* (2006.01)

(58) Field of Classification Search
CPC ..... H04L 47/22; H04L 47/2441; H04L 47/27; H04L 47/30; H04L 47/32; H04L 47/35; H04L 47/50; H04L 47/6295; H04L 47/70; H04L 49/30; H04L 49/3018; H04L 49/3027; H04L 49/90; H04L 2012/5631; H04L 2012/5632; H04L 2012/5635; H04L 2012/5636; H04L 2012/5679; H04L 2012/568; H04L 2012/5681
See application file for complete search history.

(56) References Cited

U.S. PATENT DOCUMENTS

| | | | |
|---|---|---|---|
| 8,462,786 B2 * | 6/2013 | Liu | H04L 45/7453 |
| | | | 370/389 |
| 8,738,906 B1 * | 5/2014 | Sampath | H04N 21/643 |
| | | | 713/166 |
| 8,775,352 B2 * | 7/2014 | Sen | H04L 47/20 |
| | | | 706/47 |
| 2007/0201501 A1 | 8/2007 | Suzuki et al. | |
| 2015/0281109 A1 | 10/2015 | Saxena et al. | |
| 2016/0380895 A1 | 12/2016 | Xiong et al. | |

* cited by examiner

SYSTEMS AND METHODS FOR BUFFER MANAGEMENT

FIELD OF THE INVENTION

The present invention pertains to the field of network communications, and in particular to systems and methods for buffer management in communications networks.

BACKGROUND

How an eNodeB (eNB) or a user equipment (UE) will prioritize packets within a particular radio bearer is currently left to implementation. The third generation partnership project (3GPP) standard creates multiple radio bearers with different (traffic flow templates) TFT. One non-standard-defined implementation may be a first-in-first-out (FIFO) queue, a last-in-first-out (LIFO) queue, or another queue type. The selection among the different choices of queueing methods has an impact on end-to-end applications, as well as the proper design of external signaling. Each application's flow of packets may require different treatment for best performance of the application. Each flow may require, or benefit differently from, different fairness in prioritizations between them.

Even if a UE and an eNB perform deep packet inspection (DPI) and perfectly apply the appropriate scheme for each different incoming flow adequately, this approach will not work for non-Internet protocol (IP) traffic (for which DPI will not work), or for encrypted/virtual private network (VPN) traffic where the application headers are deliberately mangled. Moreover, the actions that the upper layers perform should depend on the queueing scheme used at the lower layers.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide an improved method and apparatus for buffer management in a communications network.

In accordance with embodiments of the present invention, a method of buffering packet data units. The method comprises a buffer node receiving a complex queue configuration from a configuration entity, receiving a plurality of packet data units from at least one the packet source node, and sending each incoming packet to one of the at least two queues based on the queue graph configuration. The complex queue configuration is associated with a queue graph configuration for buffering packet data units. The queue graph configuration defines at least one packet classifier configured to determine a classification type for an incoming packet, at least two queues configured to store incoming packets, and a dequeuer configured to select a queue from the at least two queues to be dequeued and to apply a dequeueing function on that selected queue.

In accordance with embodiments of the present invention, there is also provided a buffer node comprising a receive interface configured to receive a complex queue configuration and to receive packet data units, a buffer configured to implement a queue graph configuration associated with the complex queue configuration to buffer incoming packets into queues, and a send interface configured to send the dequeued incoming packets to a destination node. The queue graph configuration comprises at least one classifier configured to determine a classification type for an incoming packet, at least two queues configured to store incoming packets, and at least one dequeuer configured to select a queue from the at least two queues to be dequeued and to apply a dequeueing function on that selected queue.

In accordance with embodiments of the present invention, there is also provided a queue graph configuration description comprising at least one classifier configured to determine a classification type for an incoming packet, at least two queues configured to store incoming packets, at least one dequeuer configured to select a queue from the at least two queues to be dequeued and to apply a dequeueing function on that selected queue, directed edges between the at least one classifier, at least two queues and at least one dequeuer, at least one input point to at least one of the at least one classifier and the at least two queues, and at least one output point from at least one of the at least one dequeuer. The directed edges define paths that the packets take based on the classification of the packets. The incoming packets first enter the queue graph configuration from the at least one input point. The incoming packets leave the queue graph configuration from the at least one output point.

In accordance with embodiments of the present invention, there is also provided a method of configuring a queue graph on a buffer node. The method comprises a configuration node sending a complex queue configuration to a buffer node.

In accordance with embodiments of the present invention, there is also provided a queue graph configuration comprising an enqueuing table. The enqueueing table comprises a QoS type column for referencing at least one queue, and a queue type column for defining the queue type for each of the at least one queue.

In accordance with embodiments of the present invention, there is also provided a queue graph configuration comprising a dequeuer table. The dequeuer table comprises a dequeuer QoS index for referencing at least one dequeuer, a dequeuer type for defining the type of each of the at least one dequeuer, and a dequeuer QoS index input list for listing the one or more queues from which packets are input into the dequeuer.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Embodiments of the present invention are directed towards systems and methods for buffer management in a communication network. In particular, a process is provided for a node (e.g., a user equipment (UE), an eNodeB (eNB), etc.) to perform queueing. This process shifts the burden of deep packet inspection (DPI) to a third party and allows for deep configurability of the device.

There are many different ways that traffic (i.e., flows of network/data packets) may be prioritized and queued within a network. Unless otherwise noted, the terms packet data unit, network packet, traffic packet, messaging packet and data packet may be used interchangeably in this description and may include control packets. Three types of general queues include first-in-first-out (FIFO) queues, last-in-first-out (LIFO) queues, priority queues and weighted or fair queueing (WFQ) queues. There are other queue types. However, these types of queues (i.e., FIFO, LIFO, priority, WFQ) represent pertinent aspects of major queueing solutions.

FIFO queueing has minimal complexity and quietly enforces ordering and fairness set by the order in which the packet data units (PDUs) arrived. This order may reflect actions taken by previous network nodes. A priority queue is a queue that sorts PDUs based on an ordering. This ordering may be based upon an explicit priority marker or flag within the PDU, or based on other fields which are used by proxy. For instance, certain ranges of IP address could correspond to different priority levels. When a priority queue sees multiple PDUs with the same priority, the multiple PDUs are typically enqueued using a different queue type (e.g., FIFO queues, LIFO queues, different priority queues, WFQ queues, etc.). A WFQ queue is similar to a priority queue. However, in a WFQ queue, the different priorities are not stateless and depend on different weight scalars that may, for example, be adjusted dynamically based on the amount of traffic for a particular flow that has already arrived.

One example of a WFQ queue is a stochastic fair queueing (SFQ) queue. SFQ attempts to fairly distribute the opportunity to transmit data to a network among an arbitrary number of flows. The SFQ queue accomplishes this by using a hash function to separate the traffic into separate (internally maintained) FIFO queues which are dequeued in a round-robin fashion or other 'fair' method. The hash references the Internet protocol (IP) address and transmission control protocol (TCP)/user datagram protocol (UDP) ports so that each 'flow' is kept separate and that each 'flow' only interferes with itself. Each 'flow' represents a set of data packets for one communication message/session between a sending or source node and a recipient or destination node.

Figure 1:
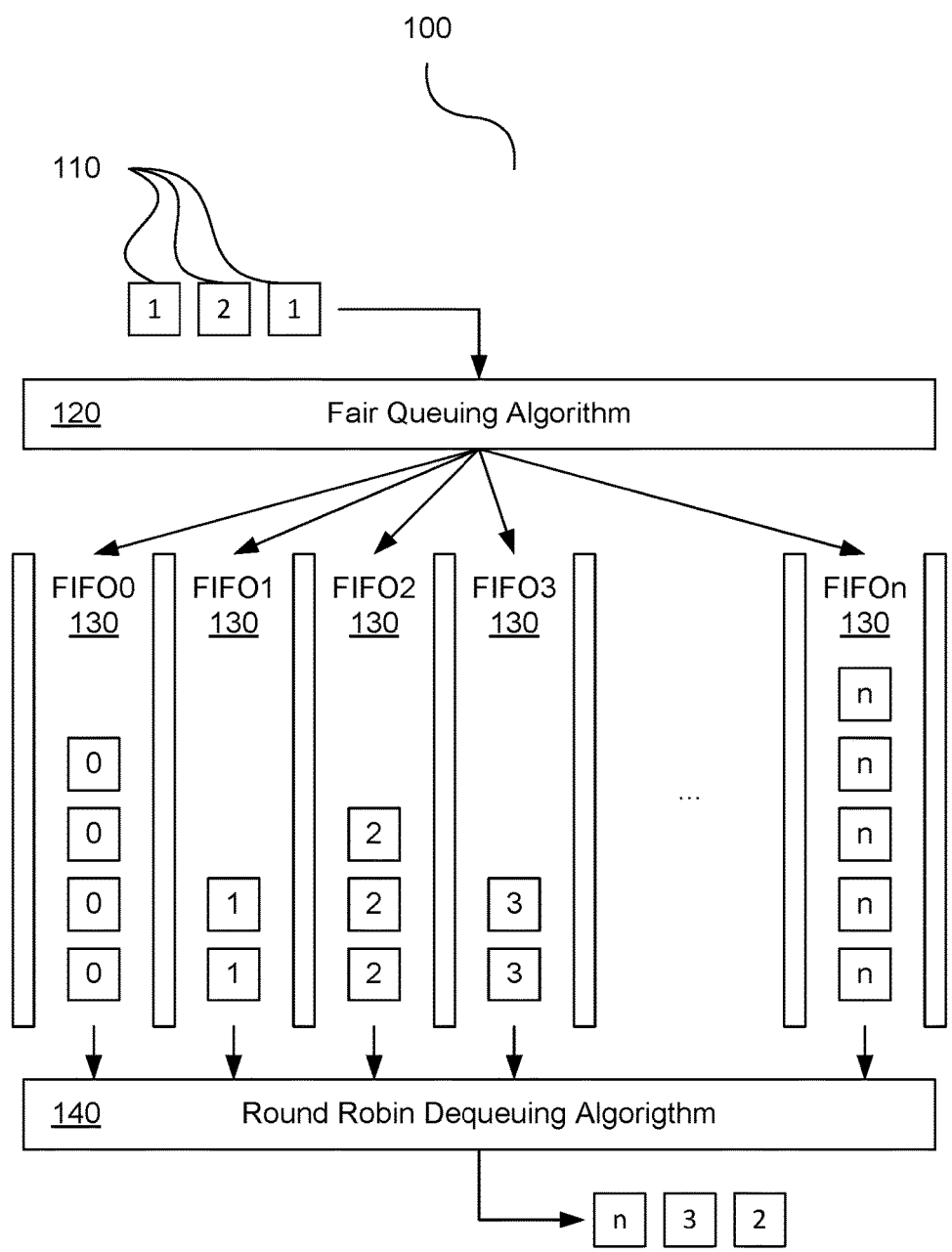
FIG. 1 illustrates an example of a stochastic fair queueing (SFQ) queue process for transmission control protocol (TCP) flow over a radio bearer.

FIG. 1 illustrates an example of an SFQ queue process 100 for TCP flow over a radio bearer. Data traffic (packet data units (i.e., network packets, data packets, control packets, message packets) 110 from different messages/sessions 0, 1, 2, 3, n) is sent through a fair queueing algorithm 120 that divides the traffic into multiple FIFO queues 130 (one for each communication message/session FIFO0, FIFO1, FIFO2, FIFO3 . . . , FIFOn). This results in each TCP flow (i.e., messages/sessions 0, 1, 2, 3, n) having a greater chance of receiving equal access to resources from a round robin dequeueing algorithm 140 (i.e., for each queue, one data packet 100 at a time is processed in a round robin manner. Other 'fair' schemes which consider packet size or other aspects are also considered. SFQ is considered to be an efficient long term evolution (LTE) packet data convergence protocol (PDCP) buffer management queueing method as SFQ has been shown to improve quality of experience (QoE). New incoming IP flows (TCP/UDP ports) may be assigned randomly to a queue. The assignment of queues may be shuffled to prevent any one flow from being stuck behind a larger flow.

A radio access network (RAN) node may not have access to a sophisticated queueing method (i.e., other than FIFO, LIFO, or the like) particularly when the packets in the traffic are encrypted. In such cases, the RAN will place the traffic into the PDCP layer as indicated from the core network (CN). Any packet reordering that will occur would then depend on the ordering priority level of the different radio bearers of a given user.

Most practical queueing systems can use a combination of the different queueing types. For instance, although LTE mandates strict priority between radio bearers' queues (higher priority first), the PDCP queue is up for implementation. Table 1 below shows the impact on the QoE for multiple flows arriving at one PDCP:

TABLE 1

| Performance comparison between different queue types | | |
| --- | --- | --- |
| Queue Type | Information Used | Performance/QoE |
| FIFO/LIFO | None | Worst |
| Priority Queue | Priority indicator (IP header (i.e., for TFT), TEID) | Good for well behaving applications |
| Fair queueing (WFQ, SFQ) | Queue indicator (TFT, TEID) | Good for 'equal' applications |

While the FIFO/LIFO type queues do not need any information about the data packets, the performance in terms of QoE is the lowest of these types. Priority queues use a priority indicator for each data packet (such as the IP header differentiated services code point (DSCP) flag or a tunnel endpoint identifier (TEID) or another QoS field in the header that maps to a priority level) and have good performance, well behaving applications. Good performance may be considered as satisfying a QoE. For example, one flow will not block another flow by being an "elephant" flow (high throughput) or by having a sudden burst of packets. Moreover, one flow may become less important at a given time and postponed. A well behaving application may be considered as an application that does not overuse the network by flooding it with packets which would create a significant head of line delay for other flows. Fair queueing type queues (e.g., WFQ, SFQ) map PDUs to various queues using a queue indicator (such as the hash of the UDP/TCP/IP fields) or other marking in the packet's header that can be interpreted as the queue indicator and have good performance for 'equal' applications (i.e., application that use the same QoE and receive the same amount of benefit for each additional packet).

In previous solutions, the choice of queue indicator is dependent on implementation and is not chosen in concert with other entities. That is, the choice of queue indicator is hard coded.

The present description describes a queueing method for radio bearers that may be configurable and may provide some relevant hooks to allow for external entities to configure the queueing method based on their preferred strategy to yield an adequate QoE. The configuration may come from the UE, from the operator or from another 'authorized' entity (i.e., an entity with security permissions to push the configuration). The queueing method for a radio bearer may be configured through radio resource control (RRC) signaling, or through management/control plane configuration.

The amount of configurability for queueing may vary over several dimensions. How different 'streams/flows' are differentiated, and once the flows are differentiated, how they are treated will be discussed below. Configurability options may include one or more of: a fixed selection of different queueing options (FIFO, SFQ) (perhaps with parameterizations for each), configuration 'language' which defines the queueing behavior, callback hooks and query flags to allow the queue to be maintained at an appropriate level, and/or a plug-in still driver allowing for full optionality.

A queue may be described using a 'queueing' language. This language describes the expected equivalent action that may be taken by a RAN node when enqueuing and dequeing a PDU. Note that the node does not need to perform the actions as specified in the queuing language, but merely perform a method similar to that exemplified by the queueing language in order to achieve the same buffering result. A queue may be described is as a graph of 'basic' queues where each 'basic' queue may have a defined behavior. The graph indicates the input/output relations of the different queues, along with their interconnections which may be termed a classifier and a dequeuer. Additionally, each queue graph has a topmost classifier, and bottommost dequeuer with which the queue graph is interfaced. I.e., to dequeue the bottommost dequeuer is called, to enqueue the topmost classifier is called.

The transfer of a packet into a queue may be expressed using a directed graph notation. Each node in a graph may be defined by a queue 220 type and a classifier 210. The classifier 210 determines which parameters are used to define a 'flow' for its level. For example, the DSCP codepoint, UE identifier, IP quintuple, etc. The queue type determines how packets are pushed (queued) or pulled (dequeued) from a particular queue. As noted above, example queues include SFQ, FIFO, LIFO, etc. Queuing and dequeuing may be performed by following flow control from the top of the graph down, with each node indicating the next step in the process.

Figure 2:
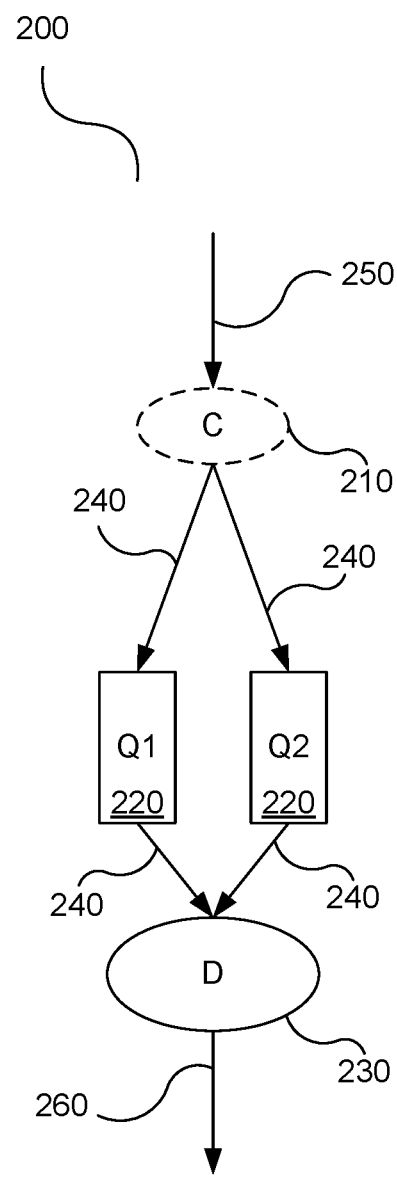
FIG. 2 illustrates, in a graph diagram, a queue graph configuration, in accordance with an embodiment of the present invention.

FIG. 2 illustrates, in a graph diagram, a queue graph configuration 200, in accordance with an embodiment of the present invention. The queue graph configuration 200 comprises a description that logically comprises at least one classifier 210 configured to determine a classification type for an incoming packet (note: in some implementations the classifier 210 may be implicit), at least two queues 220 that when instantiated (for example, in a buffer node) are configured to store incoming packets, and at least one dequeuer 230 that when instantiated (for example, in a buffer node) are configured to select a queue from the at least two queues to be dequeued and to apply a dequeueing function on that selected queue. The queue graph configuration 200 may also comprise directed edges 240 between the at least one classifier 210, at least two queues 220 and at least one dequeuer 230. The directed edges 240 define paths that the packets may take in the queue graph based on the classification of the packets. The queue graph configuration 200 may also comprise at least one input point 250 and at least one output point 260. The at least one input point 250 may be a directed edge that starts from outside the queue graph configuration 200 and ends at one of the at least one classifier 210 and the at least two queues 220. If there is more than one input point, the input points may be fed data from different slices or different PDU sessions that can point to different or the same classifier 210. Packets first enter the queue graph configuration 200 from the at least one input point 250. In some implementations, there may be at least two input points 250. For example, in a scenario where multiple network slices are implemented, each slice may provide packets to a network buffer node 300 using a different input point 250. Conversely, a network may use different output points 260 to send each slice their packets. The at least one output point 260 may be a directed edge that starts at a dequeuer 230 and ends outside the queue graph configuration 200. If there are more than one output paths, the directed edge may end at the same or different nodes outside the queue graph configuration 200 (e.g., data radio bearers (DRBs), PDCP, radio link control (RLC), media access control (MAC), etc.). Packets leave the queue graph configuration 200 from the at least one output point 260.

The basic logic of the queue, classifier and dequeuer will now be described in more detail.

A queue may have two functions called on it: enqueue and dequeue. These functions push a PDU into, or pull one out of, the queue respectively. The order of packets leaving or entering are defined by the queue type (e.g., FIFO, LIFO, SFQ, etc.) as well as the parameters associated with that queue.

A dequeuer 230 may be connected to one or more queues 220 above it and a single node below it. Based on its internal logic when triggered, the dequeuer 230 dequeues a packet from one of those attached queues 220 and provides it to whatever node follows it in the queue graph. The classifier 210 may be connected to one or more queues 220 below it, and when triggered (i.e., a PDU is sent to it), the classifier 210 chooses one of those connected queues 220.

To dequeue a packet from a queue graph, the bottommost dequeuer 230 is activated. This dequeuer 230 then chooses one of the queues above to call dequeuer on and provide to the outside entity. Similarly, to enqueue a packet into a queue graph, the topmost classifier 210 is activated. This classifier 210 then chooses one of the queues below to enqueue the packet on.

In one example of a queueing language, there may be a linkage between classifiers 210 and dequeuers 230, in which case the queue graph may be an undirected graph. In other situations, there may not be any such correspondence and a directed graph notation may be used. Using a queueing language, a queue graph may be specified as a collection of queues 220 and classifiers 210, a dequeuer 230 (e.g., round-robin, priority, weighted fairness, etc.) and how packets are forwarded between these elements. The complex queues behavior may be defined as a collection of basic queues 220 with appropriate interconnections 240. Basic queues 220 include FIFO/LIFO, priority queue, and fair queue. A priority queue may be defined by a set of queues and a priority classifier. A 'fair queue' may be defined by a queue classifier, and for each queue type a weighted fairness queue selection method may define the dequeing method. Default or pre-defined queue types may be supplied and identified by name instead of the detailed underlying queue-graph definitions, and used directly in the queueing language. Queue parameters such as buffer size, max capacity (token bucket parameters), and actions to take when a buffer/capacity is exceeded may be provided (i.e., set explicit congestion notification (ECN) bit, tail drop, etc.). Each queue defined with the queuing language may have many different parameters associated with it.

As noted above, the queue graph configuration 200 may include classifiers, queue types and queues of queue types, and prioritization/queue selection methods for dequeuing. The graph connecting each element (classifiers/queues/queues of queues/directed edges/input point/output point) together can be provided as a script, XML, text, or pseudo language or compiled module that links other compiled modules and instantiate them to form the complete queue-graph mechanism to be used.

Classifiers 210 may be given as TFTs or other matching definitions. Classifiers 210 may be expressed as a programmatical language such as protocol independent forwarding (PIF) or protocol oblivious forwarding (PoF) or P4 language or the like. Classifiers 210 may also simply refer to information contained in fields of received network traffic packets.

Queue types of queues 220 may be identified by predefined lookup tables of known queue types or predefined names such as FIFO, LIFO, WFQ, SFQ, etc. Queue types may also be defined by provided queuing/dequeing/maintaining methods in a pseudo language form or other programming language or compiled executable module.

A dequeuer 230 (i.e., a method for selecting a queue from a set of queues to be dequeued next, and applying a dequeueing method on that selected queue) may also be defined as predefined lookup tables, defined as predefined names or provided programmatically.

Directed edges 240 define the interconnections between the nodes in the queue graph configuration 200.

The queue graph may have at least one input (i.e., input point 250) and may have at least one output (i.e., output point 260) where packets are enqueued and dequeued respectively. It may have more than one input. For example, mapping different connections/PDU Session/slice connections into separate inputs of the same queue graph. Similarly, the queue graph may have multiple outputs mapping to different connections. For example, outputs to different data radio bearers (DRBs), or different connectivity medium such as LTE WLAN integration with IPSec tunnel (LWIP), LTE-wireless local area network (WLAN) aggregation (LWA) (using Wi-Fi via an LTE node), or master cell group (MCG) and secondary cell group (SCG) in dual-connectivity mode in LTE.

Figure 3:
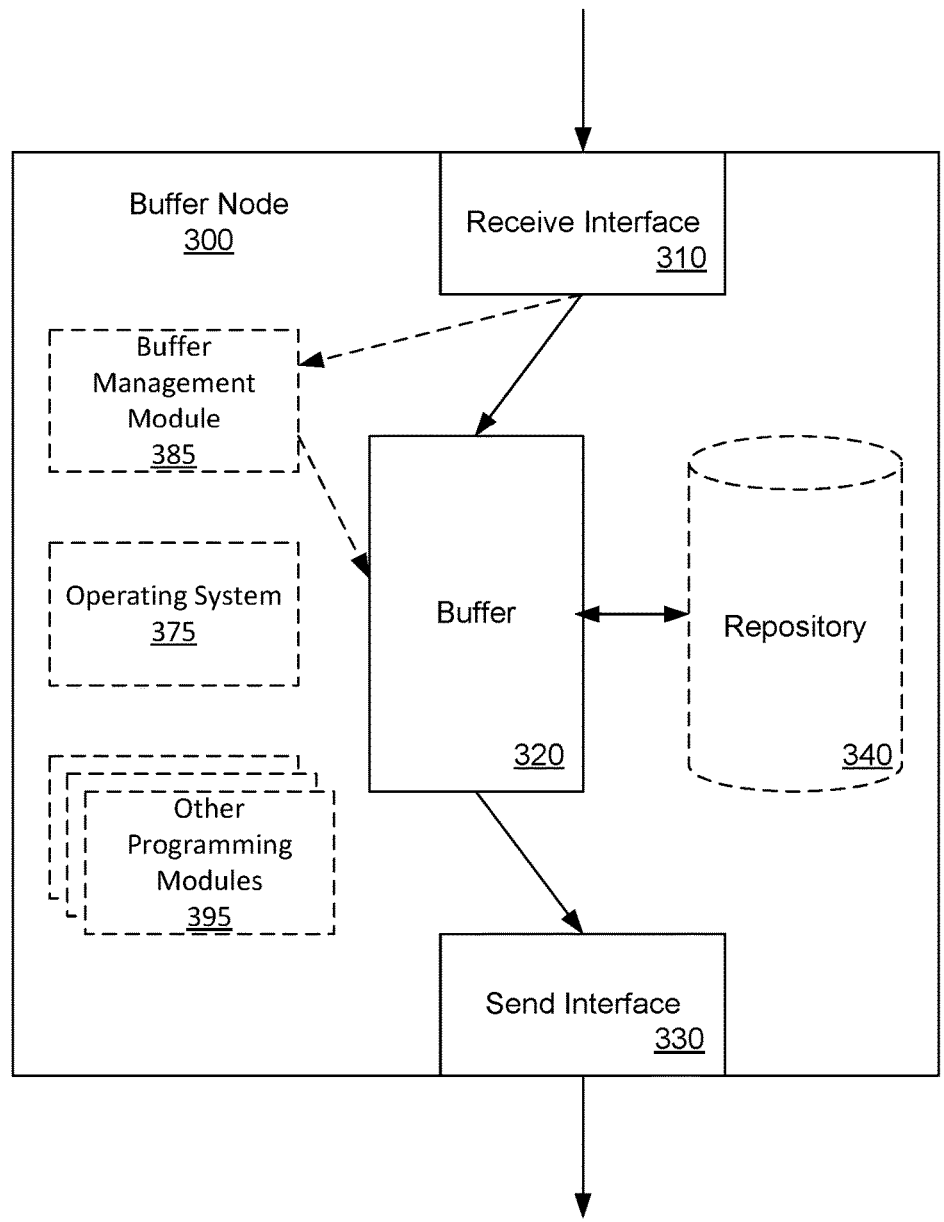
FIG. 3 illustrates, in a component diagram, a buffer node, in accordance with an embodiment of the queue graph configuration.

FIG. 3 illustrates, in a component diagram, a buffer node 300, in accordance with an embodiment of the queue graph configuration 200. The buffer node 300 comprises a receive interface 310, a buffer 320, and a send interface 330. The receive interface 310 is configured to receive a complex queue configuration (associated with a queue graph configuration as described below) and to receive data packet units from a source node on the network. The complex queue configuration and data packet units may come from separate logical or physical channels. The buffer 320 is configured to implement (or instantiate) a queue graph configuration 200 to buffer incoming packets received at the receive interface 310 into queues 220. The send interface 330 is configured to send the dequeued incoming packets to a destination node. The buffer node 300 optionally includes a repository 340 for storing queue graph configurations. The buffer node 300 may also include an operating system 375, a buffer management module 385 for managing the implementation/instantiation of the queue graph configuration in the buffer 320, and other programming modules 395 for other programming operations of the devices or components where the buffer node 300 is implemented.

The buffer node 300 may be implemented (or instantiated) at a PDCP or other protocol layer of an eNB/fifth generation eNB (gNB) or the UE. Alternatively, the buffer node 300 may be implemented at other places on the RAN where traffic packets are stored such as network slices, network functions and/or virtual network functions (including a UE, eNB, user plane (UP) gateway, etc). More than one buffer node 300 may receive a complex queue configuration. For example, both a UE and an eNB/gNB may receive copies of and implement (or instantiate) the queue graph configuration 200. In the scenario where feedback/control messaging based on the queue graph is possible, other entities which may interact with the buffer node may also be informed of the queue graph.

Figure 4A:
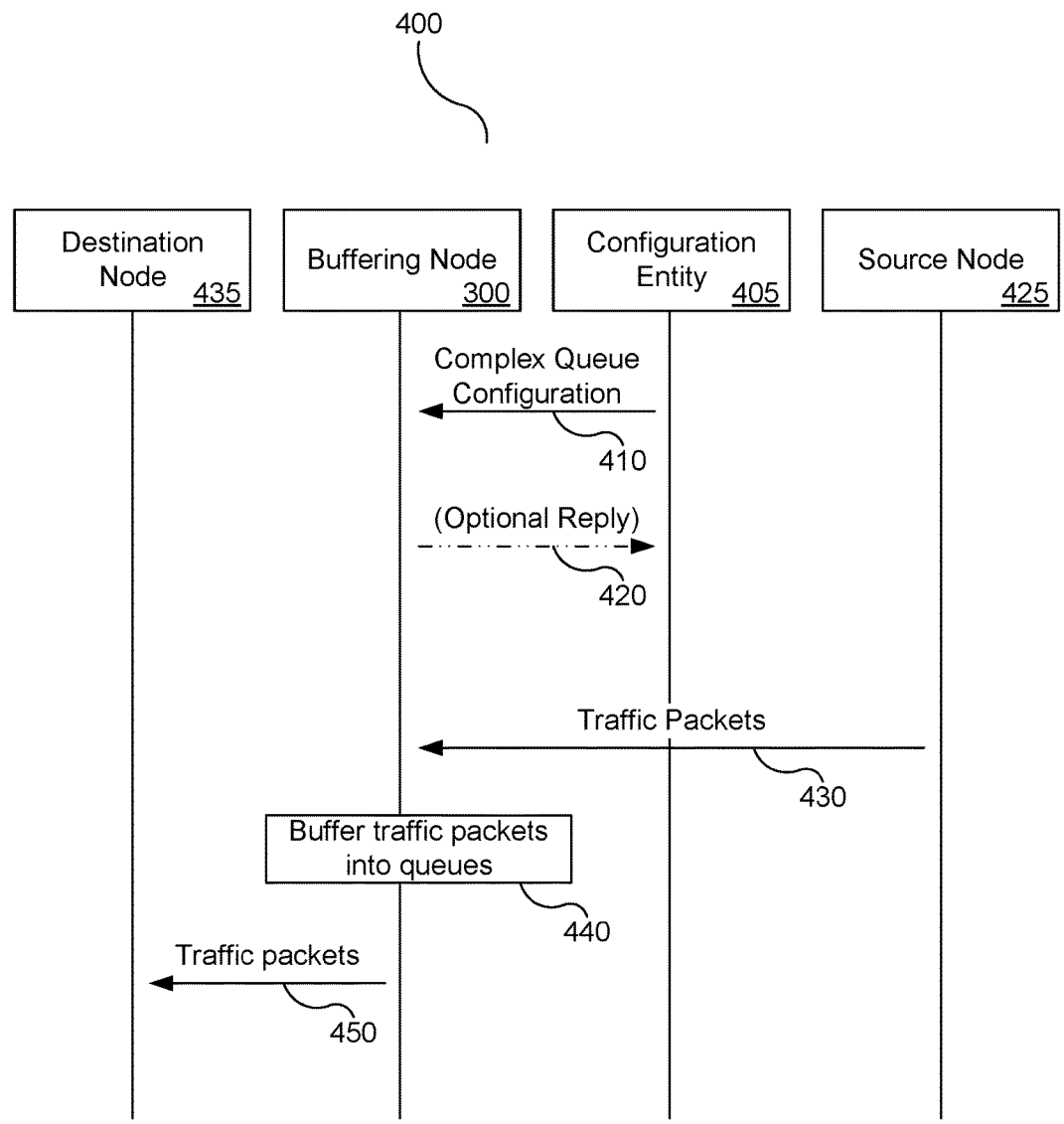
FIG. 4A illustrates, in a sequence diagram, an example of a method of configuring a queueing method for a radio bearer, in accordance with an embodiment of the present invention.

FIG. 4A illustrates, in a sequence diagram, an example of a method of configuring a queueing method for a radio bearer (400), in accordance with an embodiment of the invention. The method (400) comprises a buffer node 300 receiving a complex queue configuration (410) from a configuration entity 405 (i.e., the configuration entity sends the complex queue configuration to the buffer node 300). The complex queue configuration is associated with a queue graph configuration 200 for buffering packet data units. The complex queue configuration may be a queue graph configuration description that the buffer node 300 uses to implement a queue graph configuration 200. The complex queue configuration may be a queue graph configuration identifier that the buffer node 300 uses to obtain a queue graph configuration 200 from the repository 340 that the buffer node 300 uses to implement (or instantiate) the queue graph configuration. If the buffer node 300 does not store queue graph configurations 200 in a repository 340, the buffer node 300 may use the queue graph configuration identifier to obtain the queue graph configuration 200 from a location outside the buffer node 300.

The configuration entity 405 may be a UE operating system (OS) or an application running on the UE, the network operator or infrastructure manager, an application server (AS) in the network or on the Internet, a network slice, a core network (CN) node (including a network gateway, a control plane node, a connectivity management node, etc. Configurations may be provided and instantiated for different DRBs in a UE or for receiving the traffic of different PDU sessions, data networks or network slices.

Figure 4B:
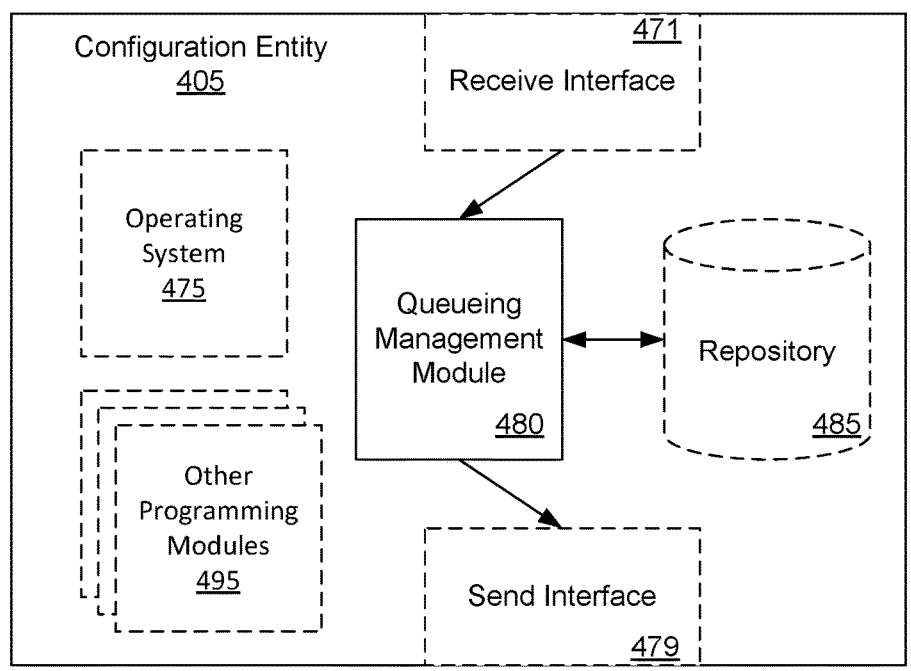
FIG. 4B illustrates, in a component diagram, an example of a configuration entity 405, in accordance with an embodiment of the present invention.

FIG. 4B illustrates, in a component diagram, an example of a configuration entity 405, in accordance with an embodiment of the present invention. The configuration entity 405 comprises a queueing management module 480 for determining and sending complex queue configurations to buffer nodes 300. The configuration entity 405 may also include a receive interface 471 for receiving communications such as acknowledgements from the buffer nodes 300, an operating system 475, a send interface 479 for sending the complex queue configurations to buffer nodes 300, a repository 485 for storing data used by the queueing management module 480 (including complex queue configurations such as queue graph configuration identifiers and descriptions, buffer node 300 information, QoS requirements for communications on the network via the buffer nodes 300, etc.), and other programming modules 495 for other programming operations of the devices or components where the configuration entity 405 is implemented.

There are scenarios in which the configuration entity 405 may update the queue graph. In one scenario, the configuration entity 405 is the control plane of a 3GPP network. A PDU session is being created or modified within a RAN node. This is typically done in response to a service request (i.e., the UE begins using a new service (e.g., view a movie, use facetime, etc.)). The control plane determines what form of queue graph corresponds to the best performance for the combination of services this UE is currently using. This is likely performed using a lookup table (i.e., via machine learning, big data analysis, etc.).

This queue graph is forwarded to the RAN node. As part of this configuration the classifier is provided. It may be that each QoS indicator, which is supplied as part of the NG-U interface, corresponds to a particular queue (the queues may be shared by multiple QoS indicators). As part of a PDU session configuration/modification, the queue graph is assigned.

A simplified queue graph configuration may exist, in which only a subset of the functionality is present. This subset may include:
  The queue graph may only have a single classifier which depends on the QoS indicator field in the NG-U data plane protocol. Essentially, which queues are shared between QoS Fields are indicated (and which are independent). This may be indicated through usage of identical prioritization values, and a parameter indicating what queueing type to use for this index.
  The parameters of the various queues: queue type (FIFO, LIFO, etc.), size, dropping policy, etc. In some instances, all queues may have the same parameters.
  A description of the dequeuer 230 which may be dependent on the QoS parameters. These QoS parameters which indicate priority indicate a single priority queue. QoS parameters which have equal priority, but different queues, indicate a 'fair' queue, the type of which may be fixed within the standard, left to implementation, or dependent on other QoS configuration parameters. If weighting (or equivalent) are available those values may inform the parameters of the 'fair' queue.

Figure 5:
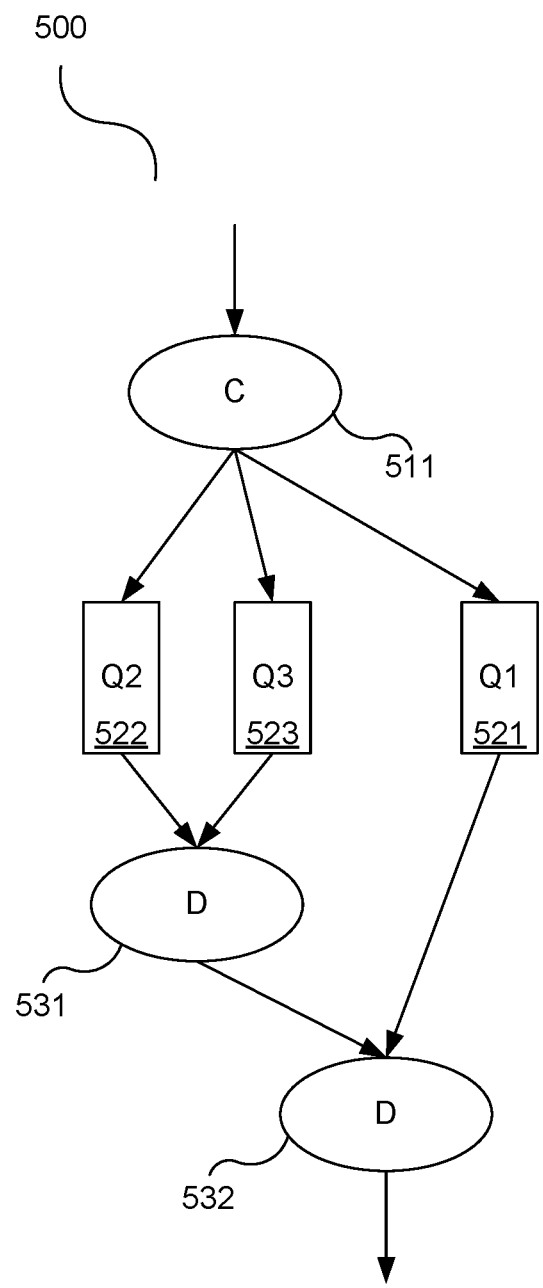
FIG. 5 illustrates, in a graph diagram, another example of a queue graph configuration.

In one scenario, the description of the queue graph may be indicated through configuration of the parameters associated with the QoS indicators associated with a PDU session creation/modification message. The QoS indicators may each be assigned parameters from which the RAN node (i.e., the buffer node 300) then forms a queue graph. FIG. 5 illustrates, in a graph diagram, another example of a queue graph configuration 500. In this example, the queue graph (i.e., queue graph configuration) 500 has two levels of dequeuer. The bottommost level is a priority dequeuer 532, the level above is a fairness dequeuer 531 between different QoS indicators (in this example, queues 522 and 523) which have the same priority.

QoS indicators may be assigned a priority parameter and a soft priority parameter. The priority parameter may be used by a priority indicator (in this example, queue 521), and the soft priority parameter may be used by the 'fair' dequeuer 531.

Additional parameters associated with the QoS indicator queues may be used. These include overflow queue behavior, rate control, queue type, etc. Rate control parameters govern the maximum accepted rate that a particular queue may use. This is typically implemented using token buckets (traffic shapers). However, other implementations are possible. What happens when a traffic exceeds that acceptable rate may depend on the parameter in overflow queue behavior. Note that if this parameter is not present, then a 'default' behavior may be applied. Some examples of overflow queue behavior include: 'buffer', i.e., to keep the packets for as long as possible; 'drop', i.e., any packets exceeding the rate limit are dropped; 'overflow buffer', i.e., any packets exceeding the rate limit are pushed in the buffer (of a given associated QoS indicator) indicated in this field. An overflow buffer provides that the QoS behavior for packets in excess falls back to behavior x.

The description of the queue graph 500 using the above format can then be summarized as a table with multiple entries, one for each QoS types. Table 2 provides an example configuration where rows (with QoS type) 3 and 4 form a WFQ (i.e., soft priority type (or index) set to a value that indicates WFQ or weighted fair queue) with lowest priority (in this case level 3) implementing a best effort path for flows. The WFQ queue comes after a FIFO (in this case level 2) queue (for perhaps a streaming flow, for example). In this example, the FIFO queue will overflow into the (level 3) best effort queue if the (level 2 LIFO) queue exceeds its size (in this example, 1M) or if more than 500 kb/s of packets are incoming. In one example, a LIFO queue may implement a VoIP flow path with highest priority (level 1).

TABLE 2

Example Enqueueing Table for Queue Graph Configuration

| QoS type | Queue Type | Rate Control | Queue Size | OverFlow QoS type | Priority level | Soft Priority type |
|---|---|---|---|---|---|---|
| 1 | FIFO | GBR 500 kb/s | 1M | 3 | 2 | |
| 2 | LIFO | GBR 2 kb/s | 0.5 KB | — | 1 | |
| 3 | FIFO | MAX Rate 20 Mb/s | 10M | — | 3 | WFQ |
| 4 | FIFO | MAX Rate 20 Mb/s | 10M | — | 3 | WFQ |

Table 2 illustrates an example of an enqueuing table of a queue graph configuration. The enqueueing table comprises a QoS type column for referencing at least one queue and a queue type column for defining the queue type for each of the at least one queue. The enqueueing table may also comprise at least one of a rate control for defining the rate of data packet units that each of the at least one queue may handle, a queue size for defining the maximum size of each of the at least one queue, a priority level for defining the priority of each of the at least one queue, an overflow QoS type for defining an overflow queue into which packets of a first queue that exceeds the rate control are pushed, and a soft priority type for defining a secondary dequeuer into which packets of a soft priority queue outputs. The overflow queue may be one of the at least one queues referenced in the enqueueing table. The secondary dequeuer may be a WFQ or other type of dequeuer.

The entire enqueueing table may be passed by the configuration node 405 to the buffer node 300 as the queue graph configuration. If a buffer node 300 already has a queue graph configuration, it may be updated by receiving a portion of an updated enqueueing table (such as one or more rows) from the same or another configuration node 405. One or more rows and/or values in the queue graph configuration may also be added, deleted, updated or overridden by receiving from a configuration node 405 a portion of (such as one or more rows), or one or more values in (such as row index and corresponding cells to update/override), an enqueueing table.

Note that the enqueueing table in this example does not list the classifier 511. In embodiments where the queue graph configuration input graph is provided as an enqueueing table, the buffer node 300 may obtain the queue type, as described above, by looking at a queue type field in an incoming packet header, by performing a hash function on the packet/packet header, or by another means. Once the queue type for the packet is determined, the packet may be sent by the buffer node 300 to the respective queue. Thus, the classifiers 230, 511 may be implicit in some embodiments. Alternatively, classifiers may have been provided via TFTs to match to different QoS queue types.

Additionally, extending the above mention queue graph table description using QoS indexes, a dequeuer table may be provided which defines how queues in Table 2 are dequeued by dequeuers 531 and 532 in the dequeuer table to form a new type of QoS flow type. This new QoS flow type may be forwarded back into a queue defined in a new row of the previous table, or the new QoS flow type may be output into a second dequeuer 532. For example, Table 3 below describes a dequeuer chain (ignoring in this case the soft priority indication of the previous table) implementing an SFQ with two queues 3 and 4, and a priority step. The generated QoS type 7 dequeuer, being a unique non-assigned QoS type created, is the main output of this queue-graph.

TABLE 3

Example Dequeuer Table for Queue Graph Configuration

| Dequeuer QoS index created | Dequeuer type | Dequeuer QoS index input list |
|---|---|---|
| 6 | SFQ | 3, 4 |
| 7 | Priority (in order of list) | 6, 1, 2 |

Table 3 illustrates an example of a dequeuer table of a queue graph configuration. The dequeuer table comprises a dequeuer QoS index for referencing at least one dequeuer, a dequeuer type for defining the type of each of the at least one dequeuer, and a dequeuer QoS index input list for listing the one or more queues or dequeuers output (referred by the created QoS index) from which packets are input into the dequeuer. As note above, the dequeuer QoS index input list may list the one or more queues from which packets are input into the dequeuer in a priority order.

The entire dequeueing table may be passed by the configuration node 405 to the buffer node 300 together with the enqueueing table as the queue graph configuration, or separately from the enqueueing table to complete the output graph of the queue graph configuration. If a buffer node 300 already has a queue graph configuration, it may be updated by receiving a portion of an updated dequeueing table (such as one or more rows) from the same or another configuration node 405. One or more rows and/or values in the queue graph configuration may also be added, deleted, updated or overridden by receiving from a configuration node 405 a portion of (such as one or more rows), or one or more values in (such as row index and corresponding cells to update/override), a dequeueing table.

Note that QoS index 5 is not in either Table 2 or Table 3. This is to show an example where a QoS index may be used elsewhere, such as for another DRB. The dequeuer QoS index input list lists the queues associated with a dequeuer. For dequeuers of a priority type, the QoS index input list may list the queues in an order of priority. Tables 2 and 3 are shown to illustrate an example implementation of a queue graph configuration. Columns may be removed, added or rearranged in a different order for different implementations. The information provided in Tables 2 and 3 may be provided in another data structure, such as records, arrays, sequence of ASN.1 structures, etc. In such cases, the information in the columns of the tables could be provided in a suitable sub-structure for the respective data structure.

In another scenario where the configuration entity 405 updates the queue graph, the configuration entity 405 works with 'application helpers'. An application helper is a function that is located along the data path and modifies the headers (encapsulation headers or IP headers) to prioritize individual packets to maximize the performance of the application it serves. The buffer bloat, which is essential to good wireless performance, makes it difficult for the application helper to prioritize effectively (particularly if there are multiple competing 'helpers'). The application helper may have non-negligible delay to the RAN node. This application helper is then assigned several (2) queues within the RAN node. These queues may in fact have the same priority. However, by leaving one queue empty, the application helper can keep the delay of some packets (e.g., TCP ACK) independent of the buffer bloat delay. The configuration entity 405 updates the queue graph of the RAN node to reflect the application helpers that currently support this UE. Alternatively, the configuration entity 405 may be the application helper and it configures the queue graph within its own PDU session.

In some scenarios, the queue graph is indicated (perhaps implicitly) by the RAN node. The different queues within this graph can be explicitly labeled and indicated as part of the user plane protocol on which queue a PDU should be enqueued is indicated.

The buffer node 300 may optionally send a reply (420) or acknowledgement to the configuration entity 405 (i.e., the configuration entity 405 receives the reply/acknowledgement from the buffering node 300). The reply may be an error message (such as a graph error, a not implementable error message, a not supported error message, a compile or processing error message that may or may not include the specific issue, etc.). The transfer of the complex queue configuration (410) and the optional reply message (420) may be included in a session request between the configuration entity 405 and the buffer node 300. A session request may be a PDU session request, an evolved universal mobile telecommunication system (UMTS) terrestrial radio access network (EUTRAN) radio access bearer (E-RAB) session request, or the like. The sending of the queue graph configuration may also be part of session modification messages such as PDU session modify, or E-RAB modify.

After the queue graph configuration is received by the buffer node 300, the buffer node 300 may receive at its receive interface 310 network/traffic packets (430) from a source node 425. These network/traffic packets may be intended for a destination node 435 and may arrive at the buffer node 300 in a different order than intended by the source node 425 for various reasons (i.e., network/multi-path/retransmission/lost packets, etc.). The source node 425 may be a tunnel end point, a network gateway, a UE OS, an operator on the network (including a network gateway), an AS on the network, a network slice, a CN node, the configuration entity 405, a PDCP entity, etc. The destination node 435 may be a RLC layer entity before a radio link, a network gateway, a UE OS, an operator on the network (including a network gateway), an AS on the network, a network slice, a CN node, configuration node 405, etc., that is to communicate with the source node 425. There may be multiple source nodes 425 (for example, multiple UEs, or other RAN nodes, may each have a source node 425). One source node 425 may also have multiple different flows with different QoS requirements. For example, a UE may have multiple applications running that may communicate with a remote destination node 435. A queue graph configuration 200 may take all of these factors into account. For example, the queue graph configuration 200 may assign separate queues of the same queue type for each source node (e.g., which may be differentiated or classified given an IP sources address). It may also have separate queues for different flow types for one same source node (which can be differentiated via for example a QoS indicator in an encapsulation header of a PDU Session).

Once the buffer node 300 receives network/traffic packets (i.e., incoming packets) (430), the packets are then buffered into various queues (440) based on the queue graph configuration. This buffering allows for the packets to be sent by the send interface 330 of the buffer node 300 to the destination node 435 in an optimized order (450) based on the scheduling/prioritization of the dequeuer 230. Other steps may be added to the method (400).

Figure 6:
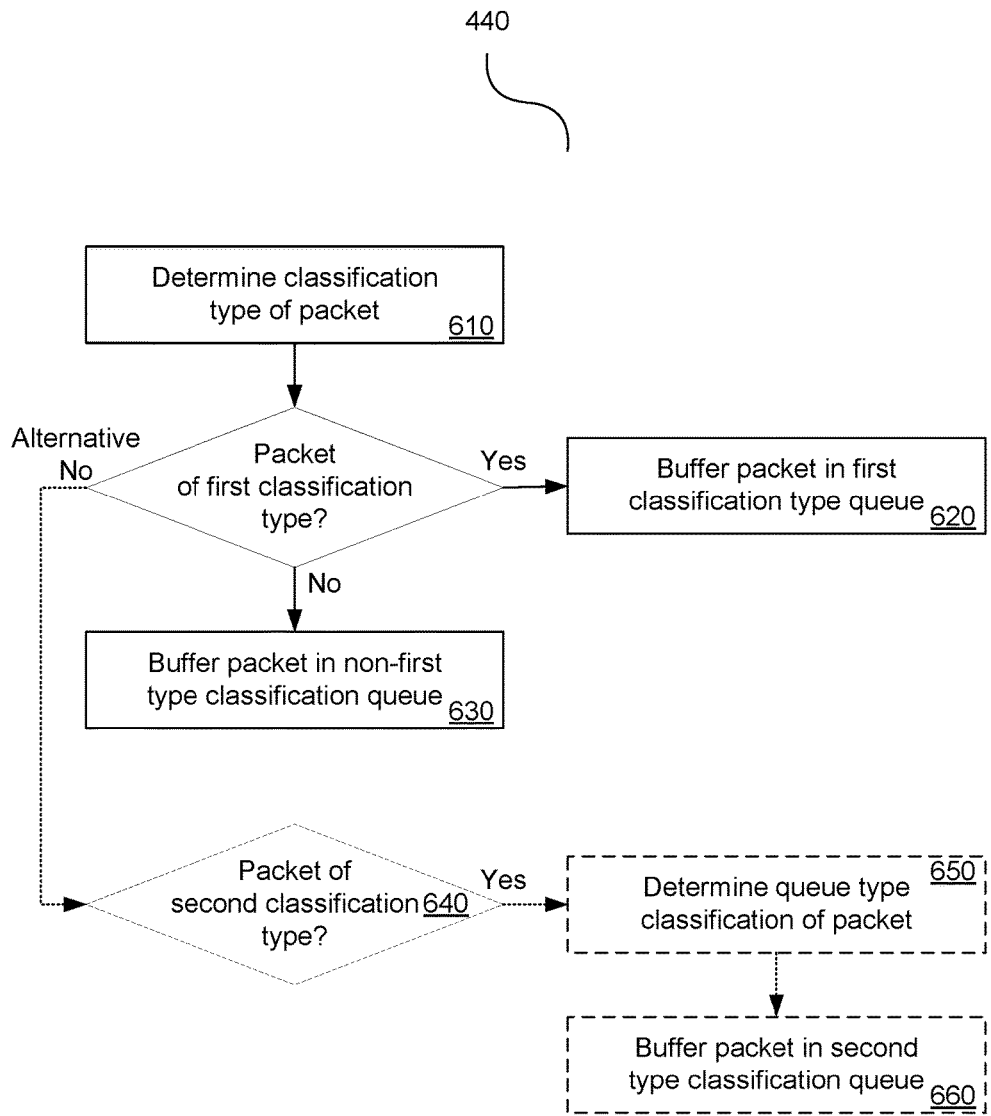
FIG. 6 illustrates, in a flow chart, an example of a method of buffering packets into queues, in accordance with an embodiment of the present invention.

FIG. 6 illustrates, in a flow chart, an example of a method of buffering packets (440) into queues, in accordance with an embodiment of the buffer node 300. The method (440) comprises determining, by a first packet classifier 210 at the buffer node 300, a classification type of an incoming packet (610). The classification type may be one of at least two classification types. If the incoming packet comprises a first classification type, the buffer node 300 sends the incoming packet to one of at least one first classification type queue 220 (620). If the incoming packet does not comprise the first classification type, the buffer node 300 sends the incoming packet to one of at least one non-first classification type queues 220 (630). Other steps may be added to the method (440), including determining in which of the at least two non-first classification type queues to send the packet.

As noted above, queue graph configurations may include more than one classifier 210. If the incoming packet does not comprise the first classification type, it may be considered to be, for example, of a second priority classification. In this alternative scenario, a first classification type may be a priority classification and a non-first classification type may be a non-priority classification. A second classifier at the buffer node 300 may determine a queue type classification of a non-priority (i.e., non-first type) classification packet (640). The queue type classification may be one of at least two queue type classifications. Once the queue type classification is determined (650), the incoming packet may be buffered into one of the at least two queue type queues based on the queue type classification (660).

There are several ways that traffic flows (i.e., traffic from source nodes 425 intended for different destination nodes 435) may be differentiated from each other. These ways may be categorized as either protocol specific or protocol agnostic.

One protocol specific differentiation approach is to use a function of protocol fields. These protocol fields may be similar to those from standards bodies, and may be referred to by name. For example, one may refer to this as a combination of function name and fields, such as:

HASH(IP dst, IP src, TCP src port, TCP dst port, IP DSCP)

where HASH refers to a specific hash function, and the different fields refer to different protocol fields. I.e., "IP dst" refers to an IP destination address, "IP src" refers to an IP source address, "TCP src port" refers to a TCP source port, "TCP dst port" refers to a TCP destination port, and "IP DSCP" refers to an IP differentiated services code point header value that is used to indicate a level of service requested for traffic. These could be multiple HASH functions for different types of traffic or the single HASHing function could be extended to traffic which does not have all these fields by several means, such as if a field is not present (i.e., for UDP traffic), a default parameter may be used or the field may be ignored entirely. Fields in HASH functions may refer to data which is not contained within a particular packet and may refer to information obtained from the underlying transport protocol (i.e., from optional fields in a general packet radio service (GPRS) tunneling protocol-user plane (GTP-U) tunnel) or from other parameters such as time of transmission. Additionally, the fields could refer to data obtained from the reverse link, such as the DSCP of a matching flow.

Many functions may be supported in protocol specific differentiation. The above example showed a HASH function used to map different variables to a smaller dimensioned space (i.e., the number of potential queues vs number of potential field combinations). A function called 'concatenate' may be provided to indicate the use of these fields when comparing types. In some scenarios, is may be beneficial to map out one output to another. For instance, a differentiated services code point (DSCP) field may be mapped to a quality channel indicator (QCI) field. This mapping may be explicitly indicated as a lookup table, and defined as a function.

One protocol agnostic differentiation approach is to borrow techniques from packet independent forwarding (PIF) to refer to fields as length offsets, with basic conditional statements to allow for multiple protocols).

Flow differentiation may also be performed by protocol labels. Other parameters, such as matches to lists of known addresses (or reverse domain name service (DNS) web pages), may also be used. This may include information about a flow from the reverse link (i.e., considering the DSCP flag of the flow in the reverse direction). The selection of parameters may be based on one or more fields within a tunnel packet header, or within an encapsulated user packet. For example, a DiffServ field of a packet header may be used. A hash of 'address' fields may also be used. A bytestream mask (for example, use 4 bytes, with an offset of 8 bytes from the beginning of the header) may also be used. Other messaging may be used based on the destination field which is known to be at location y (perhaps communicated through other means). For well known protocols, the messaging may be implicit based on protocol fields (i.e., for TCP do X, for UDP do Y). If there is no suitable field within the tunnel or user packet, an additional transport layer field may be appended to the packet to be used for queue selection.

The flow classification may be substantially performed outside the buffer node 300 (that may be implemented at a RAN node). In this case, a field indication of queue ID may be provided as part of the receive interface 310. This could be carried in an IPv6 Flow ID field or an extension header of GTP-U or other fields. In this case the flow classification is essentially dictated by that one parameter.

Flow treatment may correspond to how different flows are mapped together. Flow treatment may be defined as a combination of multiple 'basic' queues. Each of these queues may take various parameters, including a flow differentiation function, and a flow prioritization function.

In a fixed selection queue, an eNB/UE may advertise different queueing schemes. If the exact behavior of the queueing schemes is not specified, guiding principles may be available. The queue types may include FIFO, SFQ, WFQ, worst-case fair weight queueing (WF2Q), etc.

The classifiers 210 may be the flow differentiation functions discussed above. Additional parameters and behaviors in addition to flow differentiation may be defined. For example, a way to create a new queue may be provided to indicate into which queue a new incoming and differently classified flow is to go. If no matching queue is provided, a default queue may be used.

Figure 7:
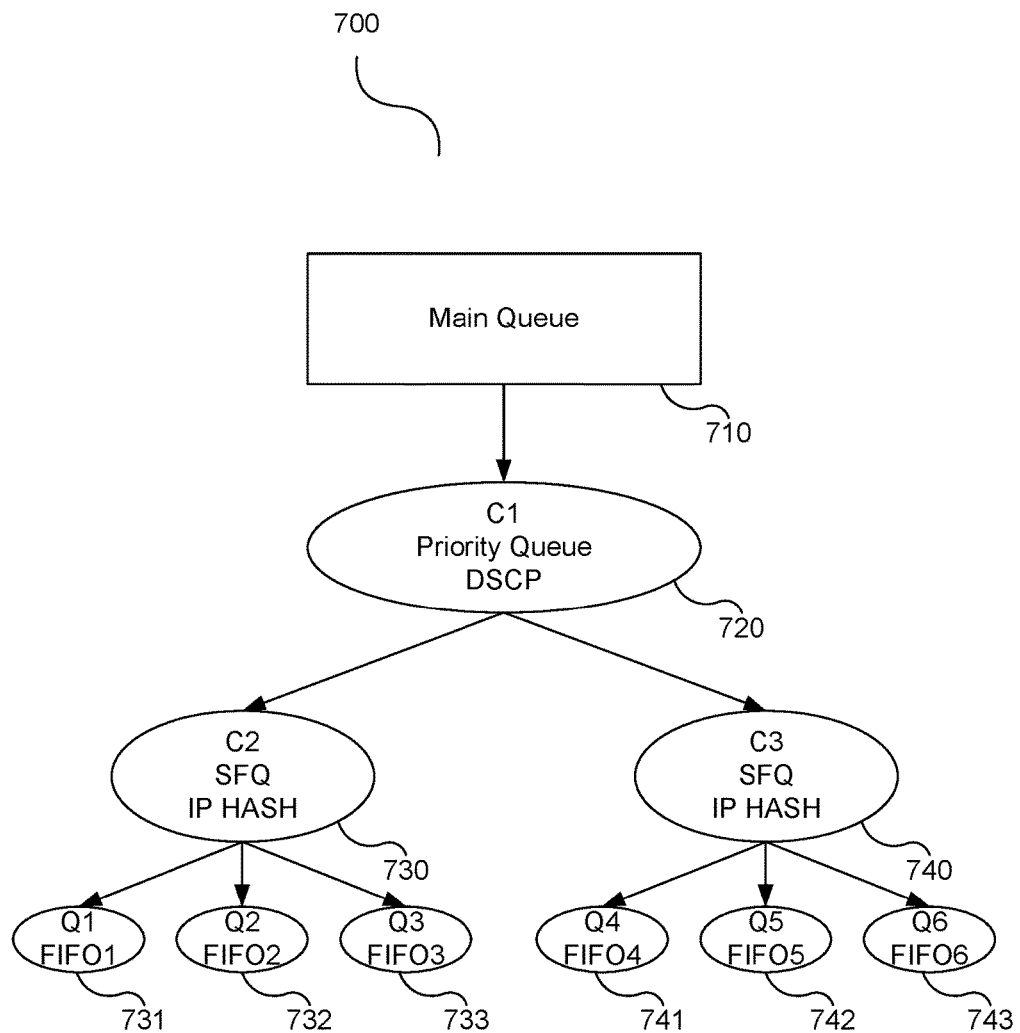
FIG. 7 illustrates, in a graph diagram, an example of an input graph for buffering packets into queues.

FIG. 7 illustrates, in a tree diagram, an example of an input graph 700 for buffering packets into queues 220. The input graph 600 shows a packet from a main queue 710 may be passed into a first priority queue classifier 720, such as a DSCP. The first priority queue classifier 720 sends packets having a DSCP priority equal to 0 to a second priority classifier (i.e., a first SFQ using IP HASH in this example) 730 and packets having a DSCP priority equal to 1 to a third classifier 740 (i.e., a second SFQ using IP HASH). The first SFQ 730 may use an IP HASH function to determine in which queue to place a packet it receives. Three FIFO queues (FIFO1 731, FIFO2 732 and FIFO3 733) are shown in this example. The second SFQ 740 may also use a similar or different IP HASH function to determine in which queue to place a packet it receives. Three FIFO queues (FIFO4 741, FIFO5 742 and FIFO6 743) are shown in this example. The following is an example of a configuration script using JavaScript Object Notation (JSON) to implement the input graph 700:

```
{
    "mainQueue" : {
        "QueueType" : "Priority Queue",
        "Classifier" : "DSCP"
            "EqualPriorityQueues": {
                { "ClassifierOutput" : 0, "QueueType", "SFQ"},
                { "ClassifierOutput" : 1, "QueueType", "SFQ"}
            }
        }
}
```

The example code presumes that there are keywords (or other included files) defining the "Priority Queue", "SFQ" and the classifier "DSCP". The dequeuers are implicitly described here with the classifier description, and the dequeueing tree is the mirror of the enqueueing one (making a complete queue graph). In this case, the main dequeuer is of priority type and may access first the SFQ side of higher DSCP priority. If no packets are present it may access the next SFQ. In each SFQ, a round-robin dequeuer accesses the queue for dequeueing.

Figure 8:
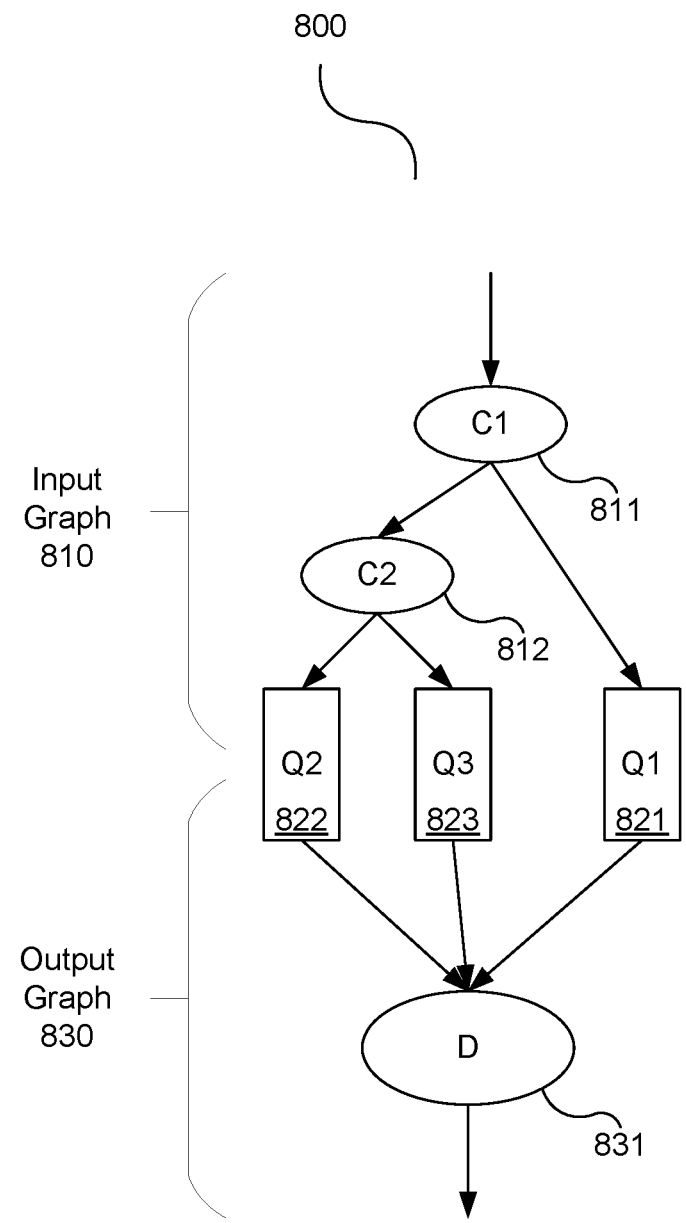
FIG. 8 illustrates, in a graph diagram, another example of a queue graph configuration.

For clarity of expression, the notation may provide two descriptions: one for the enqueuing graph (for example, Table 2 above); and one for dequeuing (for example, Table 3 above). FIG. 8 illustrates, in a graph diagram, an example of a buffering graph 800 that includes both an enqueuing graph (input graph) 810 and a dequeuing graph (output graph) 830. The input graph 810 includes a first classifier C1 811 that separates packets into two paths: one to a second classifier C2 812 and the other to a first queue Q1 821. The second classifier C2 812 further separates packets into two queues (second queue Q2 822 and third queue Q3 823). The output graph 830 begins with the three queues, Q1 821, Q2 822 and Q3 823. Packets from these three queues may be sent to a dequeuer 831 (e.g., SFQ in a round robin manner). In this example, the queues have equal weight and the graph 800 separates the classifier for queueing from the queuing types. Below is an example script to implement the buffering graph 800. In the example script below, the queue types are all set to FIFO. Other types of queues may be used.

```
{
    "mainQueue" : {
        "Queue": {
            "Type" : "FIFO",
            "Name": "Q1"}
        "Queue" :{
            "Type": "FIFO",
            "Name": "Q2"}
        "Queue" :{
            "Type" : "FIFO",
            "Name": "Q3"}
        "Input": {
            "Classifier" : "UDP/TCP",
            "Output": {
                {"ClassifierOutput" : 0, "Q1"},
                {"ClassifierOutput" : 1, {
                    "Classifier" : "SFQ",
                    "Output": {
                        {"ClassifierOutput" : 0, "Q2"},
                        {"ClassifierOutput" : 1, "Q3"}
                    }
                }}
            }
        }
        "Output" : {
            "QueueType" : "SFQ",
            "QueuePool" : ["Q1","Q2","Q3"]
        }
    }
}
```

The notation provided above is for illustration purposes and is not intended to be limiting. Any other notation providing an interpretable form of elements (queues, classifiers, queue selection methods and interconnections or packet flow between elements) may be used. XML, C, C++, pseudo code or others formats may also be used provided the receiving node is configured to interpret adequately the format.

Several types of classifiers may be used to branch packets. One type of classifier may be a protocol type, such as UDP, TCP, stream control transmission protocol, etc. Another type of classifier may be a bit field in the packet header (for example, described as P4 language). Yet another type of classifier may be IP based, such as an n-tupple source/destination IP, ports, etc.) with or without masks. Yet another type of classifier may be a DPI type, such as the type of packet using is a video stream (P-Frame/I-Frame). Yet another type of classifier may be a TFT.

There are several types of ways to select a queue for dequeuing. For example, completely fair queuing (CFQ) (e.g., round robin) approach may be used to select the next queue from which to dequeue a packet. Other ways include a head of line timestamp approach, a current queue size proportional fair approach, a weighted prioritization approach and a strict priority approach (i.e., sequential order (in priority) such as queue 1 first if it has packets, then the next in sequence).

As described above, queues may have characteristics such as a maximum size (max size), a policy dropping, a dequeuing policy, and whether or not the queue includes a timestamp. One example of a dequeuing policy is a head/tail/reorder according to a P4 defined field. Another example of a dequeuing policy is to dequeue according to a token bucket/traffic shaper status (i.e., an indication whether or not a queue has packets, and whether or not the queue has packets to dequeue at this time). Another queue characteristic may be a feedback generation on an event. For example, dropping packets generates a packet for control to be received downstream for a third party to understand the event. Additional queue graph characteristics (including for advanced queue graph topologies) may be described at implementation, for example, by way of additional columns in the queue graph table descriptions (i.e., additional columns to Table 2 and Table 3, above).

Figure 9:
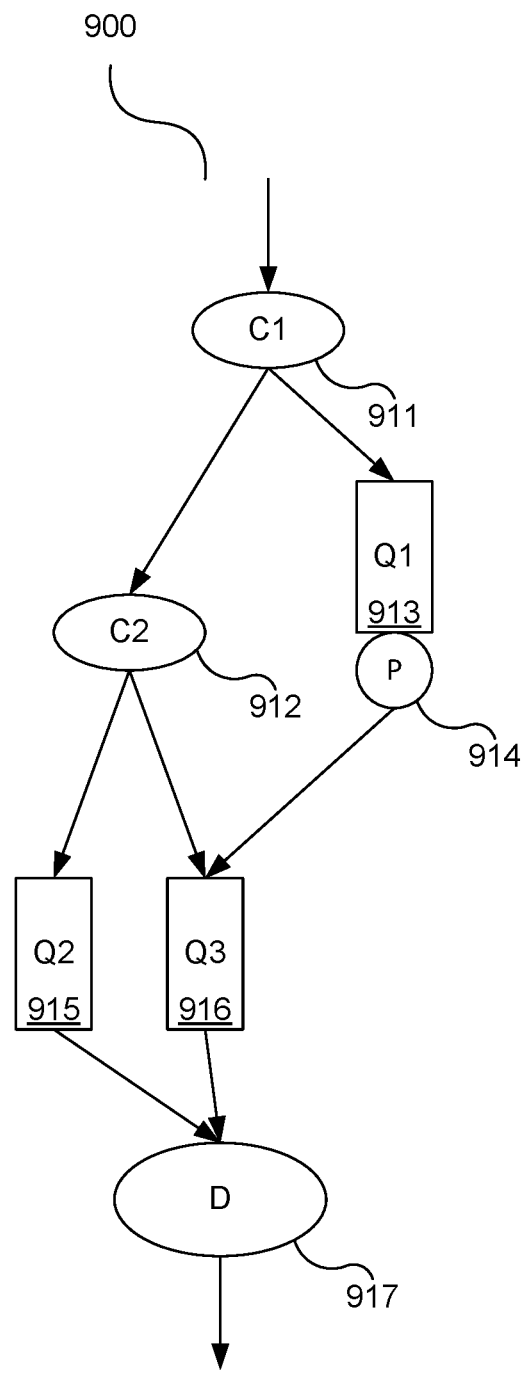
FIG. 9 illustrates, in a graph diagram, another example of a queue graph configuration.

A queuing graph may have advanced topologies that allow, for example, the buffering of packets in a queue before sending the packets to another queue or a classifier. FIG. 9 illustrates, in a graph diagram, another example of a queuing graph 900. The queuing graph 900 includes a first classifier C1 911 that passes packets to either a second classifier C2 912 or to a first queue Q1 913. The second classifier C2 912 passes packets to either a second queue Q2 915 or to a third queue Q3 916. The first queue Q1 913 includes a pacing function P 914 that introduces a delay before the packet is moved on to the third queue Q3 916. The second queue Q2 915 and third queue Q3 916 pass their packets to the dequeuer 917 (e.g., SFQ) as per the SFQ algorithm.

Since an advanced queueing may imply a potentially complex graph to instantiate on a line-speed router or node, an advance queue graph may be used to specify additional constraints. A total enqueueing delay, for example, may be the maximum delay between an incoming packet and the node's ability to execute all classifiers until it reaches the last queue in which the packet is to be placed. The buffer node 300 implementing the queuing functionality should be able to evaluate that it can provide the constraint and optionally reply with an acknowledgement or error at the time of instantiating the queuing method.

Queues may be used to implement additional functionality. For example, as described above, a queue may implement a function of pacing packets where the pacing queue makes a packet only available with a pacing delay from the previous output packet. That delay may be provided at configuration, or may be dynamically adjusted based on other defined behavior and/or conditions of the elements in the buffer (queue status, queue events, overflow, dropped packets, etc.). Another function that a queue may implement is the traffic shaping of a sub flow. Yet another function that a queue may implement is the buffering of objects (either IP objects to e.g., defragment IP packets, or other objects). Yet another function that a queue may implement is the temporary queueing of packets into larger memory to leave resources (logic and queue memory) to other priority flow (where the larger memory may be outside the specialized router's line speed logic).

Queues may also be used to implement solutions to some limitations. For example, there may be a conflict in a situation where a buffering protocol wants to pace data, but an over-the-air (OTA) and scheduler want to schedule a large grant to one user at a time to manage interference. A solution to this conflict may be to have an advanced queue perform pacing at the other end of the air interface (e.g., for uplink, inside the receiving PDCP in the RAN node).

Where a buffering protocol pushes objects, it may enable identification by a queue of the boundaries of the objects with in-band control packets (e.g., the queue holding ten unique packets of this type). The buffering protocol may then use an advance queue graph to prioritize the objects they have been fully received in order to minimize the latency of the last packet reception. This would improve the object display time. Fountain coding may also be applied on bounded objects where packets are kept in a queue until fully received, and encoded before being sent.

Configuration of the queueing/dequeueing system may also support out-of-band configuration in order to first instantiate the system. Out-of-band configuration is messaging that does not traverse the queueing system, but rather messaging between the configuring node and the node being configured. Preferably, the node implementing the queue system complies to an application programming interface (API) to receive the configuration (i.e., receive queue graph expression) and instantiate/process the queues. This can imply out-of-band control signaling such as error message/replies to reply to the configuring entity that the configuration received is erroneous or unsupported, and for which reason it is unsupported (e.g., lack of resources, memory or logic, unknown queue/classifier type, too complex of a system that could lead to excess queueing delay, inability to respect delay bounds, etc.).

In-band configuration may be used for added dynamicity to the live configuration of the queueing system. For example, one queue could be configured to purge when receiving a predefined packet. This packet would be build to traverse the classifier and make it to the queue. Another packet may delete a queue and also the classifier output to that queue. Yet another packet may trigger a messaging to the configuration controller. For example, a new TCP flow arrives, but the classifier does not know to which queue to push it. The classifier pushes the new TPC flow to a default queue and messages the controller. The controller replies with a "push packets of this flow to queue X" and it may instantiate a new queue for that and connect its output accordingly.

Reciprocal diffserv points may be used to simplify determinations of priority flows. For example, one way for a device to indicate that a particular flow was high priority on the downlink (DL) would be to indicate that it was high priority on the uplink (UL). The eNB may read this DSCP, and update the priority on the DL.

Figure 10:
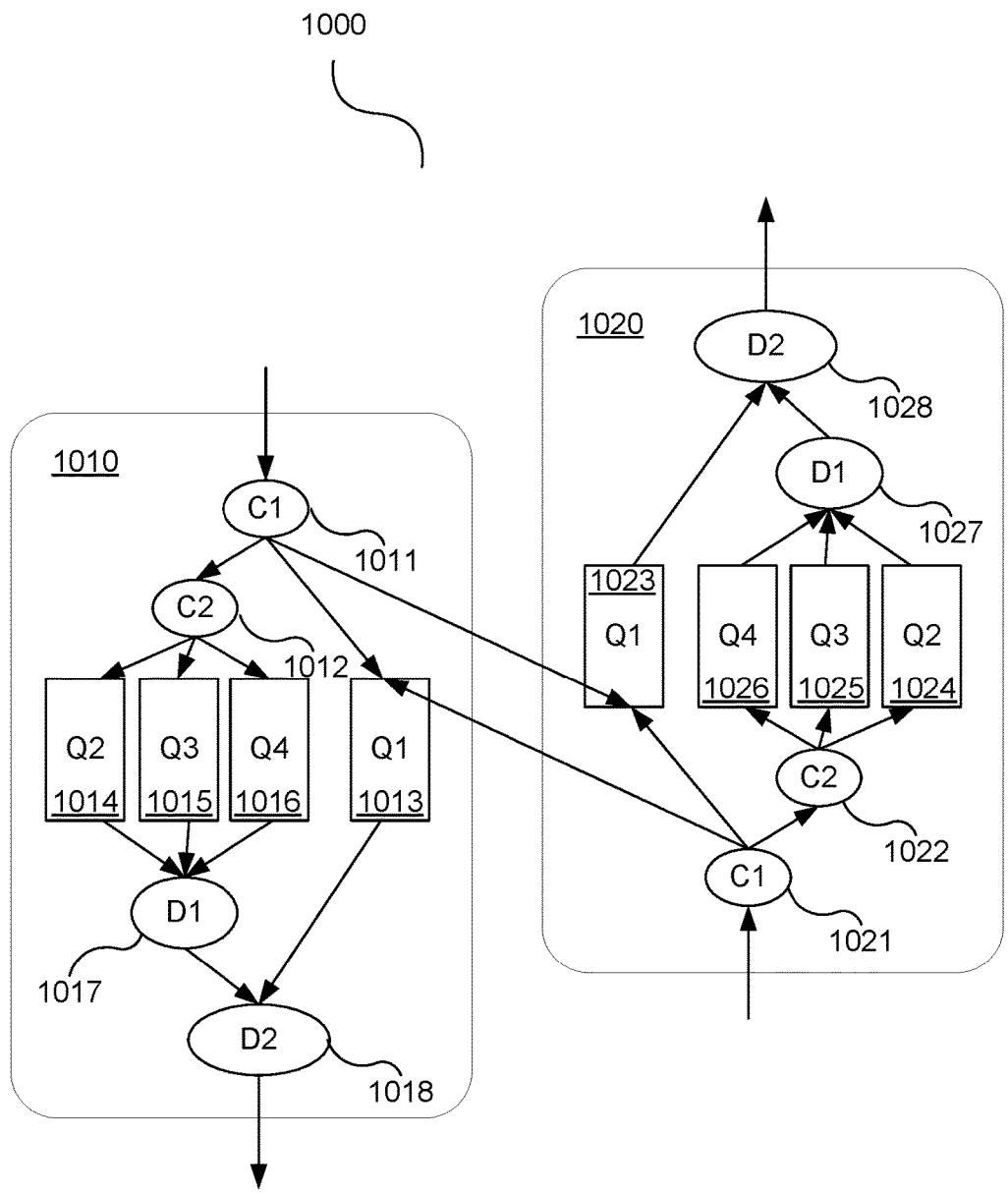
FIG. 10 illustrates, in a graph diagram, an example of an uplink packet data convergence protocol (PDCP) queue graph configuration and a downlink PDCP queue graph configuration that may communicate with each other.

FIG. 10 illustrates, in a graph diagram, an example of an uplink PDCP queue and a downlink PDCP queue that may communicate with each other 1000. In this example, the downlink graph 1010, comprises a first classifier C1 1011 that sends packets to either a second classifier C2 1012 or a first queue Q1 1013. The second classifier C2 1012 sends packets to one of three queues (Q2 1014, Q3, 1015, Q4 1016). A first dequeuer (e.g., SFQ) D1 1017 receives packets from the three queues (Q2 1014, Q3, 1015, Q4 1016). A second dequeuer (e.g., priority) D2 1018 takes packets received from the first dequeuer D1 1017 and the first queue Q1 1013, and sends the packets down the link. The uplink graph 1020 shows a similar graph in the reverse order. The downlink graph 1010 first classifier C1 1011 may also sent control packet messages to the uplink graph 1020 first queue Q1 1023. Also, the uplink graph 1020 first classifier C1 1021 may send control packet messages to the downlink graph 1010 first queue Q1 1013. The queue graphs 1010 and 1020 may be implemented at the NodeB, in a PDCP node, and may have matching queue graphs at the other side of the over-the-air OTA interface, inside the UE.

As noted above, in-band controls may be used to manage the queue graph. For example, one classifier in the uplink UE PDCP queue can change its behavior according to packets received in the downlink and vice-versa. For example, reflective QoS may be applied by altering the classification or mapping of flows to queues based on values of fields in the received downlink packets. In one example, the HASH function of a downlink RAN PDCP classifier, of the queue graph, may use a parameter which value is taken from the field of a previously received packet in the uplink UE PDCP.

A pre-determined packet may be sent OTA by one UE or NodeB node which will be interpreted by the receiving queue graph as an in-band message to drop a queue in this queue graph or in the reverse link queue graph. That is, after a full fountain coded object has been received and decoded, this pre-determined packet is generated by the receiving node to flush the remaining packets. For example, a network application server may send packets continuously. A UE may determine that it has received enough and sends a control message to the network application server to stop sending packets other than a "purge queue" packet command. In this manner, the UE is sending a control packet which the uplink RAN PDCP queue will forward to the downlink RAN DPCP queue, making the depletion of the queue faster.

Figure 11:
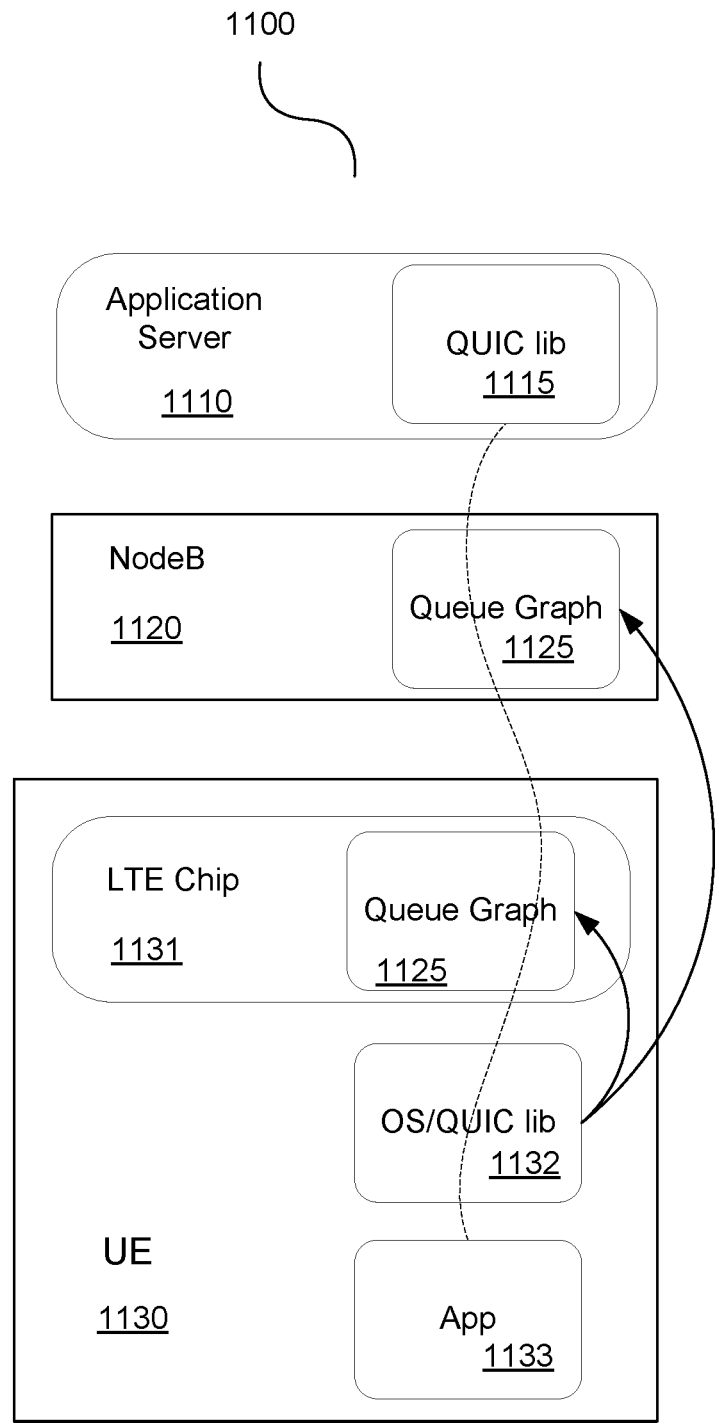
FIG. 11 illustrates, in a component diagram, an example of an implementation of buffer management environment.

FIG. 11 illustrates, in a component diagram, an example of an implementation of a buffer management system 1000. This example may apply to LTE accelerated for the quick UDP Internet connections (QUIC) protocol. The environment 1100 comprises a network application server (AS) 1110 communicating with a UE 1130 via an eNodeB 1120. The AS 1110 includes a protocol library (e.g., QUIC lib) 1115. The eNodeB 1120 includes an instance of a queue graph 1125. The UE 1130 includes a LTE chip 1131 with its own instance of the same or different queue graph 1125, an OS/QUIC lib 1132 and an application (App) 1133.

The OS of the UE 1130 and the AS 1110 are made aware of the capability of the PDCP in the eNodeB 1120. They configure the queue graph 1125 in order to reorder packets incoming from the network into the eNodeB. A queue graph 1125 is also configured in the UE's input/output PDCPs to allow un-acknowledge mode UDP in order to leave full control of which packets should be retransmitted to the QUIC protocol. Fountain coding of the QUIC protocol may catch most failed packets. Few retransmissions may occur. QUIC control packets are prioritized at either side of the air interface between the eNodeB 1120 and the UE 1130. Thus, QUIC would not need a highly reliable stream based radio link. That is, unacknowledged mode (UM) RLC may be used for this radio bearer.

Thus the queue graph configuration and buffering may be performed partly on the UE and partly on the eNodeB. For example, QUIC implements pacing of packets, which is good on the wired network and bad for OTA transmission. The configured uplink queue graph at the NodeB could provide the pacing functionality and leave the eNodeB the ability to optimize how to transmit all the data in a burst or as it suits best for the present channel conditions and eNodeB loading.

Figure 12:
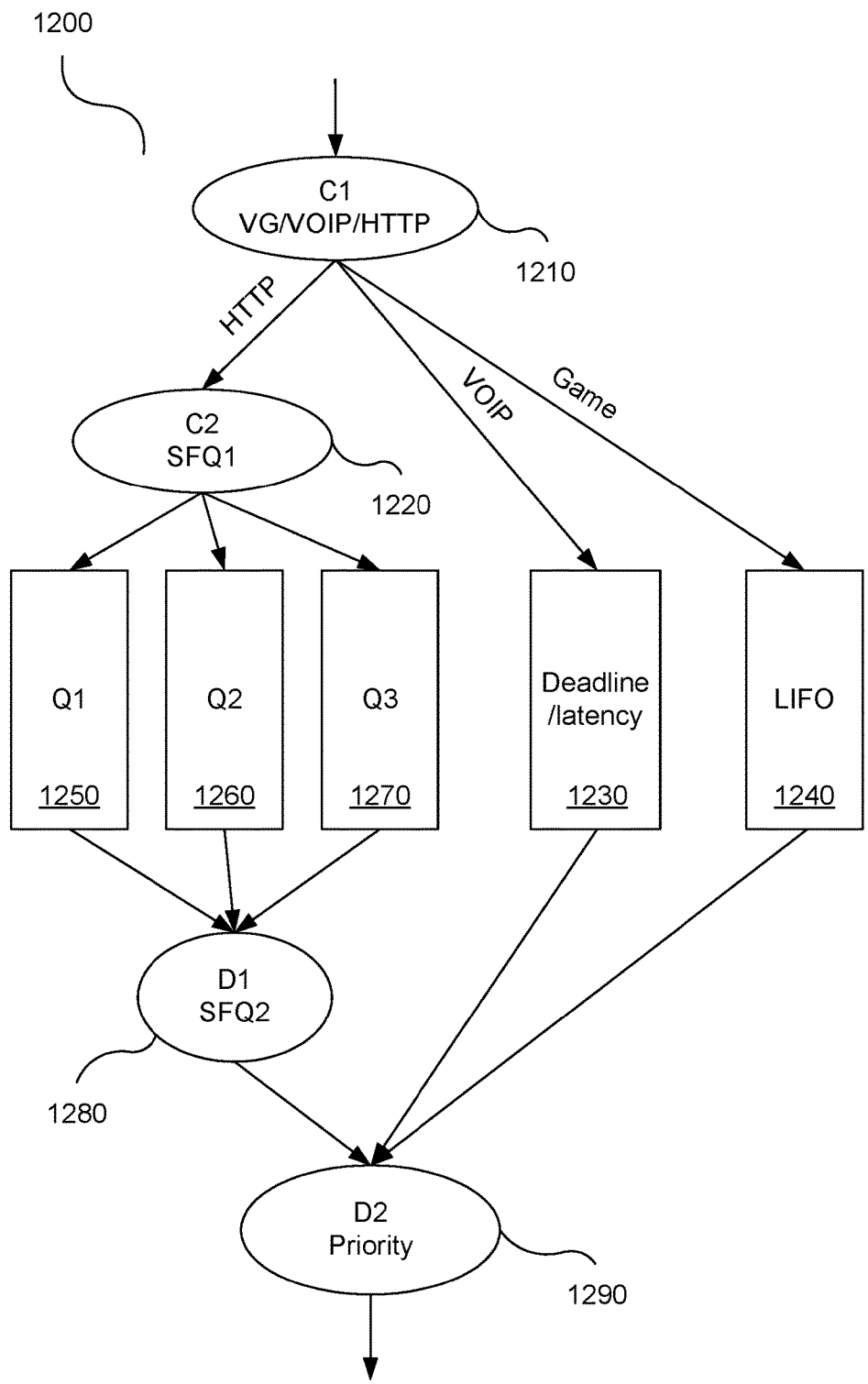
FIG. 12 illustrates, in a graph diagram, another example of a queue graph configuration.

FIG. 12 illustrates, in a graph diagram, an example of a buffer management graph 1200. The buffer management graph 1200 comprises a first classifier C1 (i.e., video game (VG)/voice over IP (VOIP)/hypertext transfer protocol (HTTP) intake node) 1210 that passes packets received at the first classifier C1 1210 to one of a second classifier C2 (i.e., first SFQ1) 1220 (for http flows), a VOIP packet queue 1230 (for VOIP flows) and a LIFO queue 1240 (for game flows). The second classifier C2 (i.e., first SFQ1) 1220 sends HTTP packets to one of three queues Q1 1250, Q2 1260, Q3 1270 (for example, based on a HASH function on the packets, or based on a queue type field entry in the packets, etc.). A first dequeuer D1 (i.e., SFQ2) 1280 obtains packets from the three HTTP queues (for example, on a round robin basis). The VOIP queue 1230 is a priority queue that requires low latency quality of service. Finally, a second dequeuer D2 (i.e., priority) 1290 obtains packets from the first dequeuer D1 (i.e., SFQ2) 1280, the VOIP queue 1230 and the LIFO queue 1240 in a priority order.

Buffer status and other metrics may be reported with respect to queue graph. Each queue could report (as configured (e.g., periodically, triggered on the CP, triggered on the data path, etc.)) information corresponding to the buffers indicated in the queue graph. This information could include current buffer size, average buffer size, average delay, peak delay (over one or more windows), packet dropping rate, or others.

Additional buffer maintenance messages can refer to the queues contained within that queue graph. Each queue can be unambiguously referred to with respect to the queue graph. This reference may use standard graph vertex labeling strategies (DFS, BFS) or others. Example maintenance messages include flush, change priority, report status, or others.

The example of FIG. 12 may be used by a network operator that wishes to enforce a particular fairness in the enhanced mobile broadband (eMBB) radio bearer. The network operator faces three strong traffic flows: video games (flows that work best with LIFO queues), VOIP (flows that should use a deadline queue), and HTTP (flows that works best with many independent queues, corresponding to individual objects). The operator may configure the queue behavior to optimize a quality of service. This may include delegating particular aspects to third parties (i.e., OS, application, protocol, etc.).

Figure 13:
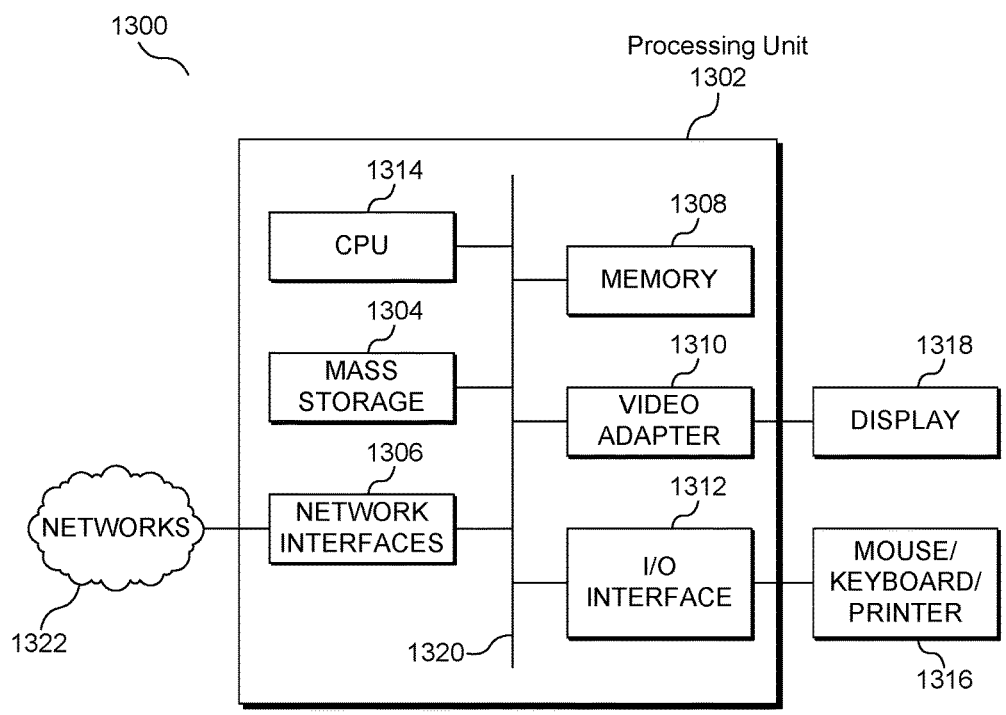
FIG. 13 is a block diagram of a computing system that may be used for implementing the devices and methods disclosed herein.

FIG. 13 is a block diagram of a computing system 1300 that may be used for implementing the devices and methods disclosed herein. Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1300 includes a processing unit 1302. The processing unit 1300 includes a central processing unit (CPU) 1314, memory 1308, and may further include a mass storage device 1304, a video adapter 1310, and an I/O interface 1312 connected to a bus 1320.

The bus 1320 may be one or more of any type of several bus architectures including a memory bus or memory controller, a peripheral bus, or a video bus. The CPU 1314 may comprise any type of electronic data processor. The memory 1308 may comprise any type of non-transitory system memory such as static random access memory (SRAM), dynamic random access memory (DRAM), synchronous DRAM (SDRAM), read-only memory (ROM), or a combination thereof. The memory 1308 may include ROM for use at boot-up, and DRAM for program and data storage for use while executing programs.

The mass storage 1304 may comprise any type of non-transitory storage device configured to store data, programs, and other information and to make the data, programs, and other information accessible via the bus 1320. The mass storage 1304 may comprise, for example, one or more of a solid state drive, hard disk drive, a magnetic disk drive, or an optical disk drive.

The video adapter 1310 and the I/O interface 1312 provide interfaces to couple external input and output devices to the processing unit 1302. As illustrated, examples of input and output devices include a display 1318 coupled to the video adapter 1310 and a mouse/keyboard/printer 1316 coupled to the I/O interface 1312. Other devices may be coupled to the processing unit 1302, and additional or fewer interface cards may be utilized. For example, a serial interface such as universal serial bus (USB) (not shown) may be used to provide an interface for an external device.

The processing unit 1302 may also include one or more network interfaces 1306, which may comprise wired links, such as an Ethernet cable, and/or wireless links to access nodes or different networks. The network interfaces 1306 allow the processing unit 1302 to communicate with remote units via the networks. For example, the network interfaces 1306 may provide wireless communication via one or more transmitters/transmit antennas and one or more receivers/receive antennas. The processing unit 1302 may be coupled to a local-area network 1322 or a wide-area network for data processing and communications with remote devices, such as other processing units, the Internet, or remote storage facilities.

Unless defined otherwise, all technical and scientific terms used herein have the same meaning as commonly understood by one of ordinary skill in the art to which this invention belongs.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method of buffering packet data units, the method comprising a buffer node:
   receiving a complex queue configuration from a configuration entity, the complex queue configuration associated with a queue graph configuration for buffering packet data units, the queue graph configuration including:
   at least one packet classifier configured to determine a classification type for an incoming packet;
   at least two queues configured to store incoming packets; and
   a dequeuer configured to select a queue from the at least two queues to be dequeued and to apply a dequeueing function on that selected queue;
   receiving a plurality of packet data units from at least one the packet source node; and
   sending each incoming packet to one of the at least two queues based on the queue graph configuration.

2. The method as claimed in claim 1, further comprising the buffer node:
   dequeueing the incoming packets in each queue; and
   for each dequeued incoming packet, sending that dequeued incoming packet to one of at least one packet destination node, the dequeued incoming packets sent to packet destination nodes in the order they are dequeued.

3. The method as claimed in claim 1, wherein receiving a complex queue configuration comprises receiving a description of the queue graph configuration to be implemented at the buffer node.

4. The method as claimed in claim 3, wherein receiving the description of the queue graph configuration comprises receiving a first enqueueing table.

5. The method as claimed in claim 4, further comprising receiving a first dequeueing table.

6. The method as claimed in claim 4, further comprising receiving at least one row from a second enqueueing table, said at least one row corresponding to rows to be added to the queue graph configuration.

7. The method as claimed in claim 4, further comprising receiving at least one row from a second enqueueing table, said at least one row corresponding to rows to be updated in the queue graph configuration.

8. The method as claimed in claim 1, wherein:
   the complex queue configuration comprises an identifier of the queue graph configuration; and
   the buffer node uses the identifier to obtain from a repository the queue graph configuration to implement.

9. The method as claimed in claim 1, wherein the sending each incoming packet to one of the at least two queues comprises for each incoming packet:
   determining, by a first packet classifier at the buffer node, a classification type of that incoming packet;
   if the incoming packet comprises a first classification type, the buffer node sending the incoming packet to one of at least one first classification type queue; and
   if the incoming packet does not comprise the first classification type, the buffer node sending the incoming packet to one of at least two non-first classification type queues.

10. The method as claimed in claim 9, wherein the determining a classification type comprises the buffer node checking a parameter of a header of the incoming packet.

11. The method as claimed in claim 9, wherein:
    the first classification type comprises a priority classification; and
    the one of at least one first classification type queue comprises a priority queue.

12. The method as claimed in claim 9, further comprising:
    determining, at a second classifier at the buffer node, a queue type classification of the incoming packet, the queue type classification being one of at least two queue type classifications; and the buffer node sending the incoming packet to one of at least two queue type queues based on the queue type classification.

13. The method as claimed in claim 1, wherein the one of at least two queues comprises a pacing queue for making the incoming packet available after a pacing delay.

14. The method as claimed in claim 1, wherein the incoming packet comprises a control packet instructing that a queue be purged.

15. The method as claimed in claim 1, wherein at least one queue in a first buffer node receives control packets from a classifier in a second buffer node.

16. A buffer node comprising:
   a receive interface configured to receive a complex queue configuration and to receive packet data units;
   a buffer configured to implement a queue graph configuration associated with the complex queue configuration to buffer incoming packets into queues, the queue graph configuration comprising:
      at least one classifier configured to determine a classification type for an incoming packet;
      at least two queues configured to store incoming packets; and
      at least one dequeuer configured to select a queue from the at least two queues to be dequeued and to apply a dequeueing function on that selected queue; and
   a send interface configured to send the dequeued incoming packets to a destination node.

17. The buffer node as claimed in claim 16, wherein the queue graph configuration comprises an enqueuer table, the enqueuer table comprising:

a QoS type column for referencing at least one queue; and
a queue type column for defining the queue type for each of the at least one queue.

18. The buffer node as claimed in claim 17, wherein the enqueuer table further comprises at least one of:
   a rate control for defining the rate of data packet units that each of the at least one queue may handle;
   a queue size for defining the maximum size of each of the at least one queue;
   a priority level for defining the priority of each of the at least one queue;
   an overflow QoS type for defining an overflow queue into which packets of a first queue that exceeds the rate control are pushed into; and
   a soft priority type for defining a secondary dequeuer into which packets of a soft priority queue outputs.

19. The buffer node as claimed in claim 16, wherein a queue graph configuration comprises a dequeuer table, the dequeuer table comprising:
   a dequeuer QoS index for referencing at least one dequeuer;
   a dequeuer type for defining the type of each of the at least one dequeuer; and
   a dequeuer QoS index input list for listing the one or more queues from which packets are input into the dequeuer.

20. The buffer node as claimed in claim 18, wherein the dequeuer table, further comprises a dequeuer QoS index input list that lists the one or more queues from which packets are input into the dequeuer in a priority order.

21. The method as claimed in claim 1, wherein the dequeuer includes a single dequeuer.

22. The method as claimed in claim 1, wherein the packet classifier includes a single packet classifier.

* * * * *